United States Patent
Bradley

(10) Patent No.: US 8,498,582 B1
(45) Date of Patent: Jul. 30, 2013

(54) OPTIMIZED MULTI FREQUENCY PIM TESTER TOPOLOGY

(75) Inventor: Donald Anthony Bradley, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 291 days.

(21) Appl. No.: 12/869,588

(22) Filed: Aug. 26, 2010

(51) Int. Cl.
*H04B 17/00* (2006.01)

(52) U.S. Cl.
USPC ........................................ 455/67.13

(58) Field of Classification Search
USPC ........................................ 455/67.13
See application file for complete search history.

(56) References Cited

U.S. PATENT DOCUMENTS

| | | | |
|---|---|---|---|
| 6,144,692 A * | 11/2000 | Beck | 375/130 |
| 2002/0094785 A1* | 7/2002 | Deats | 455/67.3 |
| 2003/0232600 A1* | 12/2003 | Montgomery et al. | 455/67.11 |
| 2009/0124122 A1* | 5/2009 | Stanford et al. | 439/578 |
| 2009/0125253 A1* | 5/2009 | Blair et al. | 702/57 |
| 2010/0085061 A1* | 4/2010 | Bradley et al. | 324/520 |
| 2010/0164504 A1* | 7/2010 | Bradley | 324/520 |
| 2010/0194382 A1* | 8/2010 | Montena | 324/126 |

* cited by examiner

*Primary Examiner* — Andrew Wendell
*Assistant Examiner* — David Bilodeau

(57) ABSTRACT

In accordance with an embodiment, a system for measuring passive intermodulation (PIM), comprises a base unit, which includes frequency-independent components, and a frequency-dependent plugin, which includes frequency-dependent components and is associated with a particular frequency band. The frequency-dependent plugin can be combined with the base unit to measure PIM over the particular frequency band.

17 Claims, 3 Drawing Sheets

OPTIMIZED MULTI FREQUENCY PIM TESTER TOPOLOGY

BACKGROUND

1. Technical Field

The present invention relates to a passive intermodulation (PIM) measurement instrument configured to utilize frequency-dependent plugins.

2. Related Art

A PIM is an unwanted signal or signals generated by the non-linear mixing of two or more frequencies in a passive device such as a connector or cable. PIM has surfaced as a problem for cellular telephone technologies such as Global System for Mobile Communications (GSM), Advanced Wireless Service (AWS) and Personal Communication Service (PCS) systems. Cable assemblies connecting a base station to an antenna on a tower using these cellular systems typically have multiple connectors that cause PIMs that can interfere with system operation.

The PIM signals are created when two signals from the same or different systems mix at a PIM point such as a faulty cable connector. If the generated PIM harmonic frequency components fall within the receive band of a base station, it can effectively block a channel and make the base station receiver think that a carrier is present when one is not. PIMs can, thus, occur when two base stations operating at different frequencies, such as an AWS device and a PCS device, are in close proximity.

The PIMs can be reduced or eliminated by replacing faulty cables or connectors. Test systems are thus utilized to detect the PIMs enabling a technician to locate the faulty cable or connector. The test system to measure the PIMs, thus, creates signals at two different frequencies, amplifies them, and provides them through cables connecting a base station to antennas on a tower for the base stations. A return signal carrying the PIMs is filtered to select a desired test frequency harmonic where PIMs can be detected and the PIM measurement is provided to an operator.

PIM testers to date have used CW signals for the two frequencies used to create the PIM. This is due to the unknown nature of where physically the PIM is located in the transmission path. The PIM is monitored by one technician while the other technician climbs the tower and physically moves the connector joints to see if the PIM changes. Other techniques plot a time graph of the PIM so a single technician can correlate his movement up the tower with results on a graph provided on a plotter below the tower.

FIG. 1 shows a block diagram of components of a prior art test system setup for measuring a PIM. The test system utilizes two signal sources 100 and 102 producing CW signals, with a first signal source 100 producing a signal at frequency F1 and the second signal source 102 producing a signal at frequency F2. When these multiple signals are allowed to share the same signal path in a nonlinear transmission medium, the unwanted signals can occur. The combined $3^{rd}$ order response is particularly troublesome as it produces an unwanted signal at 2F1-F2 that can pass from one system transmitter into another system's receiver.

The signal at frequency F1 is provided from source 100 to a high power amplifier (HPA) 104. The signal at frequency F2 is provided from source 102 to a high power amplifier 106. Both the high power amplifiers 104 and 106 are shown as 50 W amplifiers, and receive a DC power supply input shown ranging from 100 to 125 Watts to produce a 50 Watt signal output.

The output of each of the amplifiers 104 and 106 is provided through respective isolators 108 and 110 to the input of a hybrid combiner 112. The hybrid combiner 112 assures the two carrier signals F1 and F2 are isolated from each other. If they are allowed to combine without isolation, intermodulations would appear due to power output stage nonlinearities. The isolators 108 and 110 are inserted after the power amplifiers 104 and 106 to give additional isolation from any return signal from the hybrid combiner 112. The intermodulations are the same frequency as the PIM (2F1-F2), so isolation using both the hybrid combiner 112 and the isolators 108 and 110 is critical.

The outputs of the hybrid combiner 112 are provided to a commercial duplexer 114. The commercial duplexer 114 includes a transmit filter 116 and a receive filter 118. Signals F1 and F2 are provided to a first terminal via the transmit filter 116, the first terminal is connected to the front panel 120 of the instrument using a Low PIM Cable 122. Although the low PIM cable 122 is designed to minimize PIM, the low PIM cable can introduce additional PIM signals into the system. The PIM signal is provided to a second terminal via the receive filter 118. The PIM signal can be provided to a digital receiver or spectrum analyzer for measurement, such as a tuned receiver 124 which is connected to the second terminal via a $F_{PIM}$ filter 126 and Pre Amp 128.

The power needed to create the PIM is a standardized 20 W per carrier. Overall for the PIM test circuit of FIG. 1, the DC power supplied to the amplifiers 4 and 14 needs to be 50 to 60% higher to create the 20 W output due to DC and RF inefficiencies. This translates to a continuous DC power consumption of 200 to 250 Watts. The loss of power combiner 20 is 3 dB, so 25 W carriers (F1 and F2) can emerge from the combiner while other 25 W carriers that are not needed are dissipated in an internal load 130. The 50 Watt power output of the two amplifiers 104 and 106 is further reduced a total of at least 1 dB above the theoretical 3 dB loss through the hybrid combiner 112 due to the losses through cabling. Further losses in the isolators 108 and 110 and commercial duplexer 114 reduce total power so that 20 Watt carriers F1 and F2 are produced from the output of commercial duplexer. PIMs introduced by the low PIM cable 122 or other sources receiving the signals F1 and F2 will generate a return PIM signal that is provided back through commercial duplexer 114 and directed to the tuned receiver 124 for processing.

SUMMARY

Embodiments of the present invention provide a PIM tester configured to utilize frequency-dependent plugins. Rather than requiring a separate PIM tester for each frequency of interest, a single PIM tester base unit can be used in concert with a number of frequency-dependent plugins to test different frequencies associated with the frequency-dependent plugins. This reduces the cost and storage requirements associated with a large number of PIM testers. In accordance with an embodiment, a system for measuring passive intermodulation (PIM), comprises a base unit, which includes frequency-independent components, and a frequency-dependent plugin, which includes frequency-dependent components and is associated with a particular frequency band. The frequency-dependent plugin can be combined with the base unit to measure PIM over the particular frequency band.

In accordance with an embodiment, a system for measuring PIM can further include a plurality of frequency-dependent plugins, each associated with a different frequency band. Each frequency-dependent plugin can include frequency-dependent components for its associated frequency band. Additionally, any one of the plurality of frequency-dependent plugins can be combined with the base unit to measure PIM over the frequency band associated with that frequency-dependent plugin.

In accordance with an embodiment, an apparatus for measuring passive intermodulation (PIM) produced by a PIM source, comprises a first signal source producing a first signal at a first frequency and a second signal source producing a second signal at a second frequency. The apparatus can further include a test port that can be connected to the PIM source and a modular frequency-dependent plugin which includes a plurality of narrow-band components. The modular frequency-dependent plugin is operable to receive the first signal and the second signal, combine the first signal and the second signal into a combined signal, send the combined signal to the test port, and receive, in response to the combined signal, a reflected PIM signal from the test port.

BRIEF DESCRIPTION OF THE DRAWINGS

Further details of the present invention are explained with the help of the attached drawings in which.

DETAILED DESCRIPTION

In accordance with an embodiment, a system for measuring passive intermodulation (PIM), comprises a base unit, which includes frequency-independent components, and a frequency-dependent plugin, which includes frequency-dependent components and is associated with a particular frequency band. The frequency-dependent plugin can be combined with the base unit to measure PIM over the particular frequency band.

Figure 1:
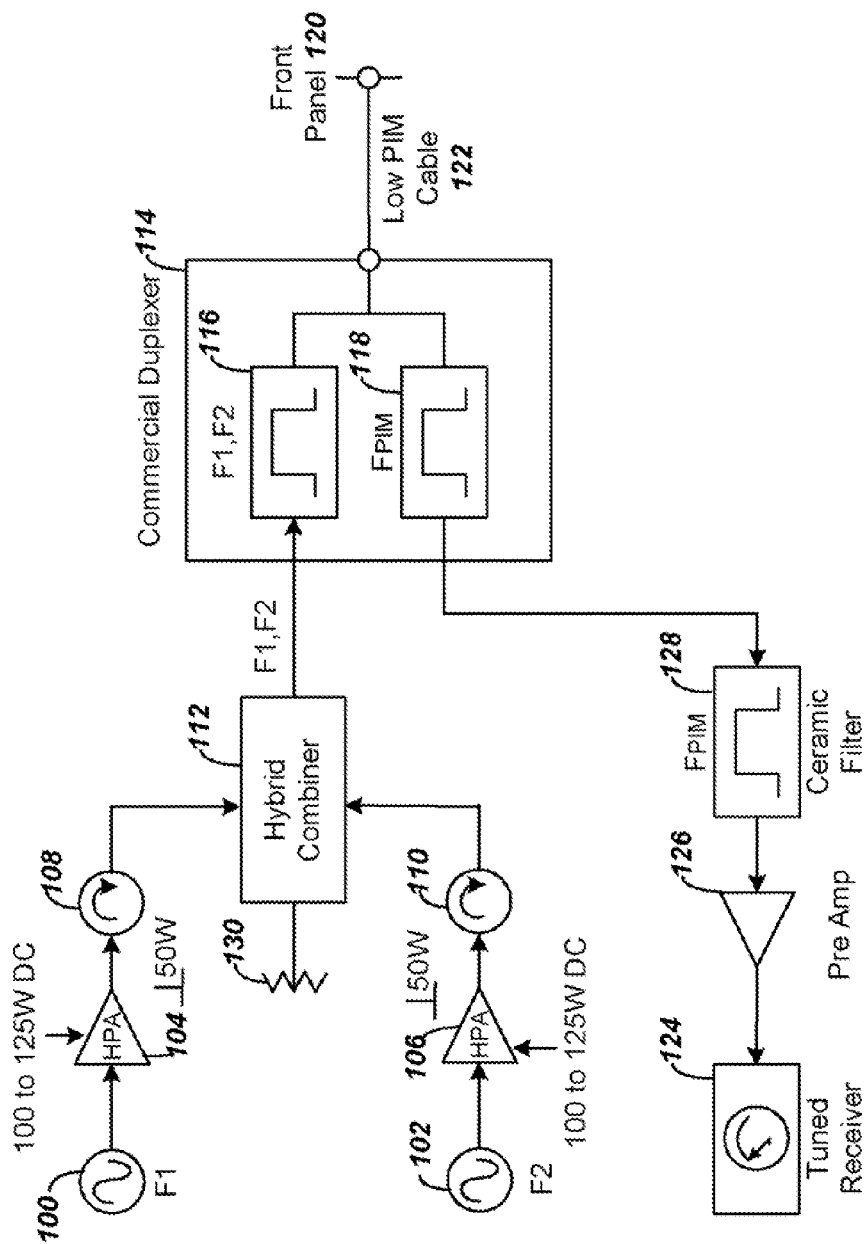
FIG. 1 shows a block diagram of components of a prior art test system for measuring a PIM.

Typical PIM testers, such as that described above with respect to FIG. 1, are generally large and bulky instruments. This is often due to the attempt to make the hardware contained in each PIM tester as broadband as possible, and using filters as the frequency-dependent variable to determine the frequency range over which any particular PIM tester is useful. The filters used in typical PIM testers are generally conventional off the shelf duplexers used at the actual site due to cost considerations. These commercial duplexers are designed to handle higher powers than needed in PIM testing, so they are over sized for the intended use.

Additionally, the test port of a PIM tester must be connected to this filter using a cable, for convenient front panel position. This cable can introduce one or more PIM sources in addition to those present in the system under test.

Furthermore, other broadband components generally used in typical PIM testers also contribute bulk to, and increase the power consumption of, typical PIM testers. For example, the broadband power amplifier design utilized in typical PIM testers can waste half of its power in the power combiner, which can require the use of amplifiers with twice the needed power. In addition to the bulk and power demands of such components, these components can also produce significant amounts of heat which can require additional components to provide sufficient heat extraction.

These components are typically configured as a unit and boxed as an instrument. Each instrument operates over a fixed frequency, this therefore requires a multitude of instruments to cover all of the frequencies of interest to a user. With each instrument weighing upwards of sixty pounds, this can introduce significant space and storage burdens on the user.

Figure 2:
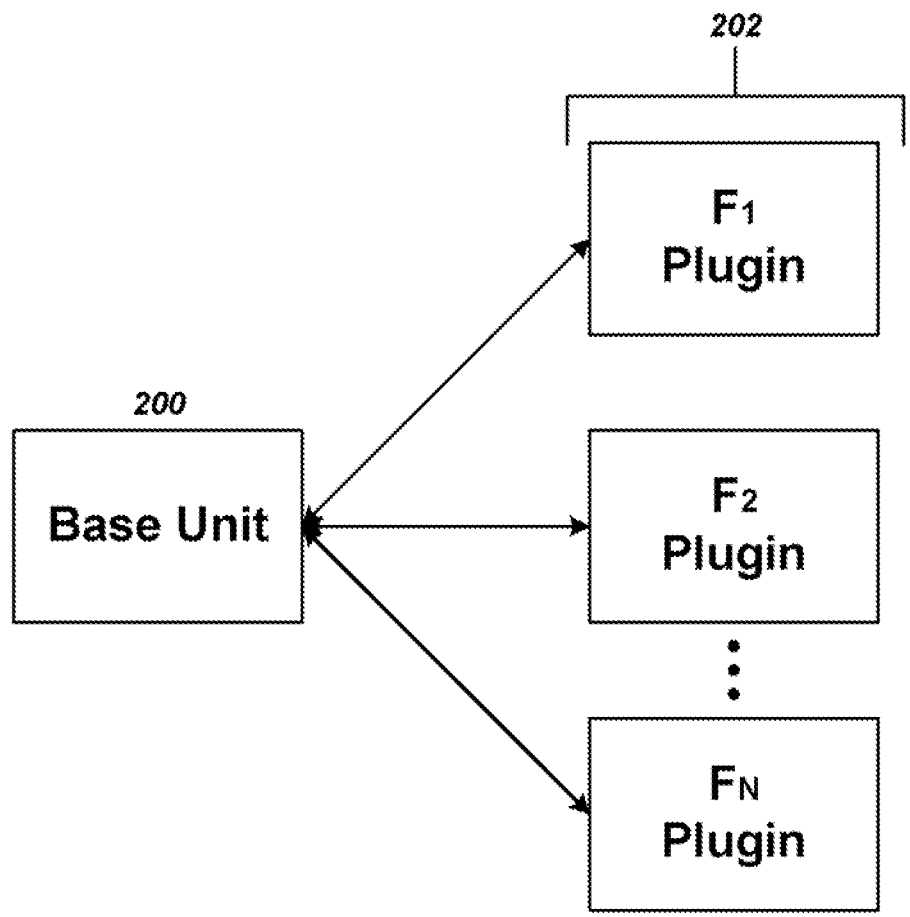
FIG. 2 shows a block diagram of a PIM test system including a base unit and a plurality of modular frequency-dependent plugins in accordance with an embodiment.

FIG. 2 shows a block diagram of a PIM test system including a base unit and a plurality of modular frequency-dependent plugins in accordance with an embodiment. Because typical PIM testers primarily include broadband components, most of the components from one instrument to the next are redundant. The filters used in each instrument are the main determinant of the useful frequency range for that instrument. Therefore, one way to save cost and space is to divide each PIM tester into a base unit 200, which includes the broadband components common to all similar PIM testers, and a plurality of frequency-dependent plugins 202, each of which includes those components which make that PIM tester specific to a particular operating frequency.

In accordance with an embodiment, by so dividing the PIM tester, a single base unit can be used to test whatever frequency is of interest to a user, by using an appropriate plugin. This can reduce space requirements, by reducing the number of instruments kept on hand and can further reduce costs since where previously several complete PIM testers would be bought, now a single base unit and several plugins can be used instead. Additionally, each plugin can plug directly into the base unit, with the exterior of the plugin serving as the front panel of the combined instrument. Thus, no additional cables are required to conveniently position a test port, eliminating at least one potential PIM source.

In accordance with an embodiment, an apparatus for measuring passive intermodulation (PIM) produced by a PIM source, comprises a first signal source producing a first signal at a first frequency and a second signal source producing a second signal at a second frequency. The apparatus can further include a test port that can be connected to the PIM source and a modular frequency-dependent plugin which includes a plurality of narrow-band components. The modular frequency-dependent plugin is operable to receive the first signal and the second signal, combine the first signal and the second signal into a combined signal, send the combined signal to the test port, and receive, in response to the combined signal, a reflected PIM signal from the test port.

Figure 3:
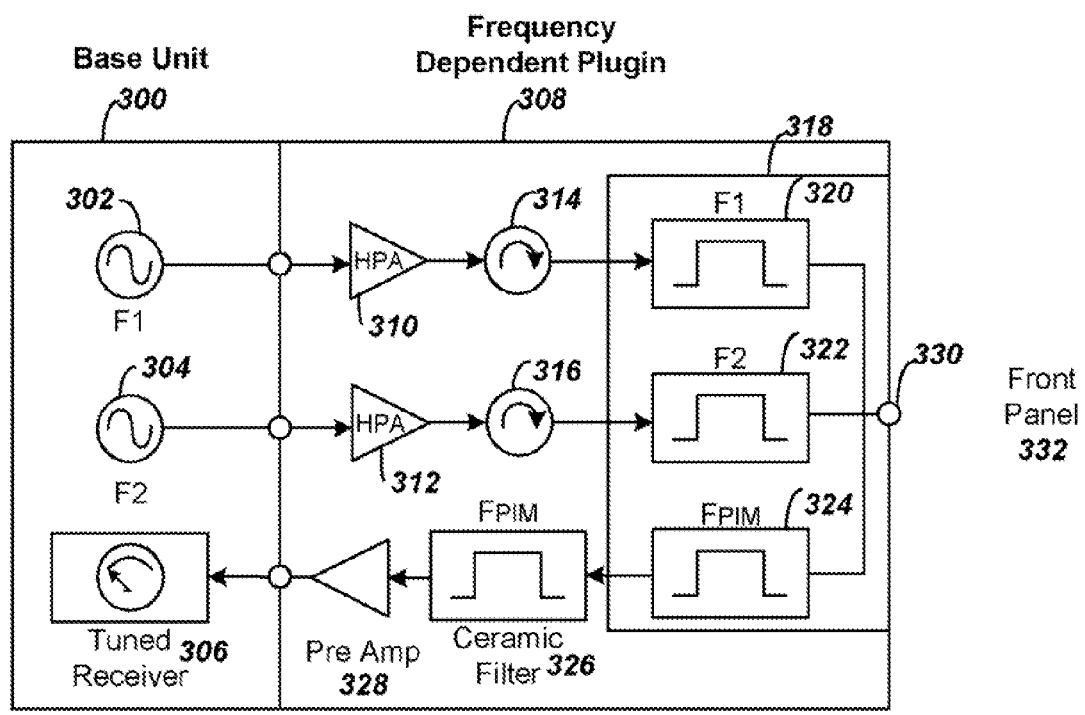
FIG. 3 shows a PIM test circuit in accordance with an embodiment.

FIG. 3 shows a PIM test circuit in accordance with an embodiment. In accordance with an embodiment, broadband components, including broadband power amplifiers, broadband isolators, broadband power combiners, and off the shelf duplexers, can be replaced with customized narrow band components. These narrow band components can include high efficiency amplifiers, narrow band low loss isolators, and a low loss diplexer.

As described above, a PIM test system can be divided into a base unit and several modular frequency-dependent plugins. As shown in FIG. 3, a base unit 300 includes the frequency independent components which are common to all PIM testers, these components can include signal generators 302 and 304 as well as tuned receiver 306. Each frequency-dependent plugin 308 can include high efficiency amplifiers 310 and 312 and narrow band isolators 314 and 316. These components can be smaller and require less power to operate, thereby generating less heat and eliminating the need for additional, active cooling components. This can result in a significant reduction in size of the PIM tester.

In accordance with an embodiment, each frequency-dependent plugin can also include a custom duplexer 318 which includes three filters: filters 320 and 322 corresponding to signals F1 and F2, respectively, and filter 324 corresponding to the PIM frequency range. Filters 320 and 322 are a part of a diplexer which replaces the isolators and combiners found in earlier PIM testers. In earlier PIM testers, the combiner caused a 3 db drop in power, which required doubling the power input to each input port. However, in accordance with an embodiment of the present invention, each filter 320 and 322 acts as a zero-loss isolator. Additionally, filter 324 acts as a isolator preventing the two transmit signals from creating intermodulation products in the ceramic filter 326 or pre amp 328 which would mask the actual test results.

In accordance with an embodiment, the narrow band components, including the custom duplexer, can be incorporated into the frequency-dependent plugins. The Test Port is the combined port of the special filter, thus eliminating the extra PIM source in the measurement chain. Other components (i.e., the broadband or frequency independent components) can be configured as a base unit and boxed as an instrument. This leaves the narrow band and frequency-dependent components to be housed in the easily removable frequency-dependent plugins.

In accordance with an embodiment, by utilizing modular narrow band amplifiers, narrow band low loss Isolators and a custom duplexer with attached test port housed in one compact, interchangeable frequency-dependent plugin, instrument size and weight as well as power consumption can be reduced. Each custom duplexer is designed to specifications relating to the measurement requirements, allowing greatly reduced size. Instrument size reduction can approach 10 to 1 thus allowing 10 separate frequency bands in the same space as one previous PIM tester. Additionally only one controller and user interface are needed to support the various plugins. Each plugin can further include factory calibration as well as personality data, stored in non volatile memory.

Although the present invention has been described above with particularity, this was merely to teach one of ordinary skill in the art how to make and use the invention. Many additional modifications will fall within the scope of the invention, as that scope is defined by the following claims.

What is claimed is:

1. A system for measuring passive intermodulation (PIM), comprising:
a base unit which includes frequency-independent components configured to produce test signals in a broad frequency band and a receiver adapted to receive a reflected PIM signal generated by a PIM source;
a plurality of modular frequency-dependent plugins selectively connectable between the base unit and the PIM source, each operating over a different frequency band and including a narrow band amplifier and a narrow band isolator for each signal source, a duplexer and a test port connectable to the PIM source;
wherein the frequency-dependent plugins include frequency-dependent components and are associated with a particular frequency band narrower than the broad frequency band;
wherein the frequency-dependent plugins are connectable between the base unit and the PIM source to measure PIM over the particular frequency band;
wherein the frequency-dependent plugins are disconnectable from the base unit so that the frequency-dependent plugins associated with different frequency bands within the broad frequency band can be connected to the base unit; and
wherein the frequency-dependent plugins receive the reflected PIM signal from the test port, and pass the reflected PIM signal to the tuned receiver.

2. The system of claim 1 further comprising:
a plurality of frequency-dependent plugins, each associated with a different frequency band, wherein each frequency-dependent plugin includes frequency-dependent components for its associated frequency band; and
wherein any one of the plurality of frequency-dependent plugins is connectable between the base unit and the PIM source to measure PIM over the frequency band associated with that frequency-dependent plugin.

3. The system of claim 2 wherein each of the plurality of frequency-dependent plugins shares a common interface.

4. An apparatus for measuring passive intermodulation (PIM) produced by a PIM source, comprising:
a base unit including a first signal source configured to produce a first signal at a first frequency, a second signal source configured to produce a second signal at a second frequency, and a tuned receiver adapted to receive a reflected PIM signal generated by the PIM source; and
a plurality of modular frequency-dependent plugins selectively connectable between the base unit and the PIM source, each operating over a different frequency band and including a narrow band amplifier and a narrow band isolator for each signal source, a duplexer, and a test port connectable to the PIM source; and
wherein each modular frequency-dependent plugin is operable to
receive the first signal and the second signal,
combine the first signal and the second signal into a combined signal,
send the combined signal to the test port,
receive, in response to the combined signal, the reflected PIM signal from the test port, and
pass the reflected PIM signal to the tuned receiver.

5. The system of claim 1, wherein
the base unit includes a pair of signal sources and a receiver; and
the frequency-dependent plugin includes a test port connectable to a PIM source, a narrow band amplifier for each signal source, a narrow band isolator for each signal source, and a duplexer.

6. The system of claim 5, wherein the frequency-dependent plugin includes a computer readable storage medium having calibration data and performance characteristics data for the frequency-dependent plugin stored thereon.

7. The system of claim 2, wherein
the base unit includes a pair of signal sources and a receiver; and
each of the frequency-dependent plugins includes a test port connectable to a PIM source, a narrow band amplifier for each signal source, a narrow band isolator for each signal source, and
a duplexer.

8. The system of claim 7, wherein each of the frequency-dependent plugins further includes a computer readable storage medium having calibration data for the corresponding frequency-dependent plugin stored thereon.

9. The system of claim 2, the base unit is a broadband device, and wherein the band of the base unit comprises at least the frequency bands of each of the plurality of frequency-dependent plugins.

10. A system for measuring passive intermodulation (PIM), comprising:
a base unit including components configured to produce test signals in a broad frequency band and receive resultant PIM signals;
a plurality of modular frequency-dependent plugins selectively connectable between the base unit and the PIM source, each operating over a different frequency band and including a narrow band amplifier and a narrow band isolator for each signal source, a duplexer and a test port connectable to the PIM source;

wherein the frequency-dependent plugins, are each associated with a different frequency band narrower than the broad frequency band, wherein each of the plurality of modular frequency-dependent plugins includes components that receive the produced test signals within the associated frequency band and provide the resultant PIM signals to the base unit;

wherein the broad frequency band of the base unit comprises at least the combined frequency bands of each of the plurality of frequency-dependent plugins and wherein any of the frequency-dependent plugins is connectable between the base unit and a PIM source to measure PIM over the associated frequency band of the frequency-dependent plugin.

11. The system of claim 10, wherein the plurality of frequency-dependent plugins share a common interface.

12. The system of claim 10, wherein
the base unit includes a pair of signal sources and a tuned receiver; and
each of the frequency-dependent plugins includes a test port connectable to the PIM source, a narrow band amplifier for each signal source, a narrow band isolator for each signal source, and a duplexer.

13. The system of claim 12, wherein each of the frequency-dependent plugins further includes a computer readable storage medium having calibration data and performance characteristics data for the corresponding frequency-dependent plugin stored thereon.

14. The system of claim 1, wherein the base unit has a first housing and the frequency-dependent plugin has a second housing including a front panel for controlling the system when the frequency-dependent plugin is connected with the base unit.

15. The system of claim 2, wherein the base unit has a primary housing and each of the plurality of frequency-dependent plugins have respective housings each including a front panel for controlling the system when the respective frequency-dependent plugins are connected with the base unit.

16. The apparatus of claim 4, wherein the base unit has a primary housing and each of the plurality of frequency-dependent plugins have respective housings each including a front panel for controlling the apparatus when the respective frequency-dependent plugins are connected with the base unit.

17. The system of claim 10, wherein the base unit has a primary housing and each of the plurality of frequency-dependent plugins have respective housings each including a front panel for controlling the system when the respective frequency-dependent plugins are connected with the base unit.

* * * * *